Patented Jan. 1, 1952

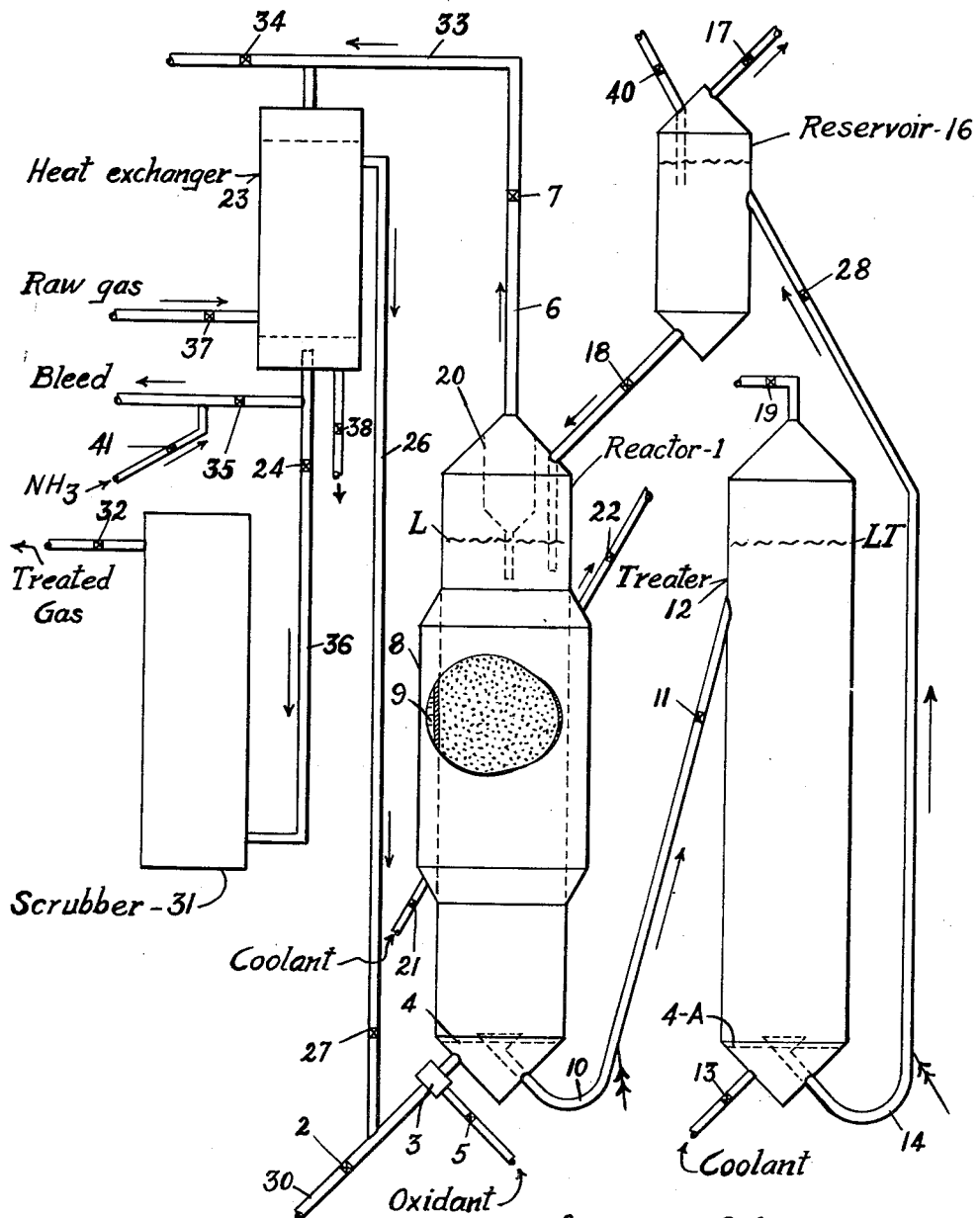

2,581,135

UNITED STATES PATENT OFFICE 2,581,135

PROCESS FOR THE REMOVAL OF OXIDIZABLE SULFUR COMPOUNDS FROM A HYDROCARBON GAS MIXTURE

William W. Odell, Elizabeth, N. J., assignor to Standard Oil Development Company, a corporation of Delaware Application February 12, 1948, Serial No. 7,985

3 Claims. (Cl. 23—3)

This invention relates to process of promoting oxidation of combustible matter. In particular it relates to the preferential oxidation of one or more components of a mixture of different oxidizable materials while in the gaseous or vapor phase. It deals with the oxidation of readily oxidizable sulphur compounds when the latter are present in a gaseous mixture in such a manner that products of oxidation may readily be removed from the unoxidized gases. It also relates to the production and recovery of by-products in the treatment, purification and partial oxidation of combustible matter which matter is initially present in the mixture and in the vapor phase.

It has been found to be costly and difficult to remove hydrogen sulphide from natural gas when it is present therein in very appreciable amounts such as 1000 grains or more per 100 cubic feet. The old procedures using iron oxide mixed with shavings is cumbersome and requires extremely large apparatus and is adaptable for use chiefly at low pressures. It is customary so far as is known to use an amino compound or other basic material such as an alkaline phosphate as an absorbent for this sulphur gas by contacting it with the gas usually under pressure and regenerating the solution for recirculation in contact with additional volumes of gas. This procedure is costly and the by-products are not recoverable without further expenditure of effort and materials. However, in this invention the hydrogen sulphide is preferentially oxidized under such conditions and in the presence of a particular amount of an oxidant that it reacts substantially completely without appreciable oxidation of other gaseous components associated therewith. Preferential oxidation of a component of a gas mixture is not in itself new but the effects obtained in the practice of this invention are new and the conditions under which the reactions are promoted are specific to this case.

One of the major objects of this invention is to oxidize a component of a gasiform mixture under conditions whereby an appreciable excess of oxidant is not required and under conditions such that substantially none of the other components of the mixture is simultaneously oxidized. Another object is to so preferentially oxidize a particular component of a gasiform mixture that a recoverable valuable by-product is produced. Still another object is to accurately control the temperature while promoting limited oxidation of combustible matter in contact with a catalyst so that optimum yields of desired oxidation products are obtained. Another object of this invention is to promote preferential oxidation of a gasiform mixture under conditions whereby the effluent stream of reaction products is substantially free of excess oxidant. Other objects will become evident from the disclosures made hereinafter.

Generally, the reactions which occur in the practice of this invention are exothermic in nature and may be typified by Equations 1 to 5 below which are reactions in which sulphur compounds are oxidized. Although this invention is by no means limited to the oxidation of sulphur compounds, as will become apparent, the equations are presented because they are typical and because they relate to reactions which occur in the examples.

|     |                                      | Calories  |
| --- | ------------------------------------ | --------- |
| (1) | $H_2S + \tfrac{1}{2}O_2 = H_2O + S$  | +65,700   |
| (2) | $H_2S + 1\tfrac{1}{2}O_2 = H_2O + SO_2$ | +136,700 |
| (3) | $CS_2 + 3O_2 = CO_2 + 2SO_2$         | +265,130  |
| (4) | $CS_2 + 2H_2O = CO_2 + 2H_2S$        | +128,330  |
| (5) | $2H_2S + SO_2 = 3S + 2H_2O$          | +60,400   |

It is well known that hydrogen sulphide oxidizes according to Reactions 1 and 2 and it is known that reaction 2 takes place substantially to the exclusion of Reaction 1 when the amount of oxygen present during oxidation is sufficiently great. It has been found difficult to promote the reaction shown in Equation 1 without some $SO_2$ forming and without using an excess of oxygen. It has further been found difficult to control the reactions when employing fixed beds of refractory or catalyst material as contact medium. In fact it appears that practical application of known principles has been retarded because of these difficulties. In the practice of this invention $H_2S$ may be oxidized under controllable temperature conditions without employing excessive amounts of oxidants and reaction can be promoted as indicated by Equation 1 or Equation 2; the conditions for accomplishing this are specific. The invention can best be described with reference to the drawing.

The drawing shows diagrammatically and largely schematically in elevation one form of apparatus in which this invention may be practiced.

Referring to the drawing, the reactor I is adapted to confine a bed of finely divided solids, and in which the solids may be fluidized by gasiform stream. The solids may be either catalytic or non-catalytic, or a mixture of catalytic and non-catalytic solids, the latter being particularly advantageous when the concentration of the more readily oxidizable component of the gaseous mixture is appreciable. The reactor is connected to inlet valve 2 for introducing a gasiform fluid to be treated, to valve 5 for introducing an oxidant, and to a mixing chamber 3 where an oxidant and gasiform fluid are thoroughly mixed and a grid 4 through which the mixed oxidant and gas stream pass upwardly. The gasiform stream upon passing upwardly through the reactor leaves through dust collector 20, offtake 6, valve 7, and conduit 33, to heat exchanger 23, from which it passes through valve 24 and conduit 36, to scrubber 31, from which it exits through valve 32. Outlet valves for bleeding the gas are shown at 34 and 35. The middle portion of the reactor is jacketed as shown at 8 and confines a temperature controlling medium 9. Finely divided solids which solids are commonly catalytic solids are confined in reactor 1 and when these are fluidized they have a level designated as L in the drawing. Upon drawing off finely divided solids which may be done continuously they pass through offtake 10 and valve 11, into treating chamber 12, wherein a bed of the solids is maintained with a definite predetermined level such as is indicated by LT. Coolant is introduced into the treater 12, in amounts required through valve 13, passing upwardly through grid 4-A and through the mass of solids in the treater and out through offtake valve 19. The finely divided solids after being temperature controlled, cooled for example, are withdrawn from treater 12, usually continuously passing through offtake 14, up to reservoir 16, through valve 28. The off gases from 16 are discharged through valve 17 and the cooled solids collecting in reservoir 16, pass through valve 18, back to reservoir 1 for recirculation. In order that the solids may be truly countercurrently contacted with the temperature controlled medium in treater 12, this treater is preferably largely filled with relatively large size packing material which material prevents the ebullient motion of the solids throughout the bed in treater 12. Coolant for jacket 8, is supplied through valve 21 and is discharged, commonly in the vapor phase, through valve 22; the discharged vapor can, of course, be condensed and recirculated. The raw gas to be treated passes at least in part through inlet valve 37 to heat exchanger 23 and thence preheated through conduit 26 and valve 27 to conduit 30 and mixing chamber 3 to reactor 1. Extra, finely divided solids are supplied to the system as needed through valve 40 to the reservoir 16. The double arrows indicate a supply of a fluidizing medium in amounts required to maintain these solids in a substantially fluidized state.

*Example 1.*—Referring to the drawing the invention will be illustrated by treating a natural gas containing 2% of hydrogen sulphide and recovering sulphur therefrom. This amount of sulphur represents approximately 1274 grains per 100 cubic feet of gas. The finely divided solids used in the particular example are preferably catalytic to the oxidation of hydrogen sulphide; they may comprise kaolin, alumina, iron oxide or mixtures of these or they may comprise other oxidation catalysts known to function catalytically in this capacity. The size of the solids should preferably be 20 to 150 mesh. The gas supplied to mixing box 3, preferably shold be at a temperature above about 300° C. regardless of whether it is introduced entirely through valve 2, entirely through valve 27, or partly through each of these valves. The gas entering the combustion zone is preheated in order that a great part of the combustion zone will not be wasted in bringing the gases up to the ignition temperature of the more readily oxidizable component of the gaseous mixture. In this manner also uniform temperature is more readily obtained in the bed in that it will not be relatively cool at the bottom and relatively hot at the top. Oxygen or a gas containing oxygen but preferably not air because of the dilution effect of the nitrogen is introduced through valve 5 and the amount used is approximately and very closely 10 cubic feet of oxygen equivalent per 1000 cubic feet of total natural gas to be treated. The mixture of oxygen and preheated gas is passed directly into reactor 1, up through grid member 4 into the mass of catalytic solids confined therein at such a velocity that the mass is in turbulent motion the particles being substantially in ebullient motion with a bed level substantially as shown at L. The superficial velocity under the described condition will vary from about 5 feet per second with the larger size and denser catalyst particles to less than 1 foot per second with the smaller particles and/or less dense catalyst. In this example the hydrogen sulphide is oxidized in accordance with Equation 1 and the temperature throughout the bed in reactor 1 is maintained substantially uniform at approximately 450° C. The gas outlet temperature, namely the temperature of the gas leaving reactor 1 through offtake 6 is approximately 500° C. and the inner surface of the temperature controlled portion of the reactor wall is substantially 400° C. or somewhat less. Under these conditions the reaction will proceed substantially quantitatively without employing any appreciable excess of oxidant and the sulphur resulting from reaction will pass out in the vapor phase in the gas stream containing the natural gas, leaving through offtake 6. It is necessary to supply a coolant through valve 21 to the reactor jacket in amounts adapted to remove approximately 3000 B. t. u. per 1000 cubic feet of the natural gas treated. The coolant may be such a material as diphenyl ether, diphenyl benzene or other coolant circulated preferably under superatmospheric pressure adapted to maintain the chosen wall temperature. Catalyst of 20 to 150 mesh is preferably employed as described so that the necessary high velocity of stream flow through the catalyst bed can be employed without carrying over excess of catalyst; high velocity and resultant low contact time with the catalyst is desirable to prevent the occurrence of secondary reactions which will occur if prolonged time of contact is maintained. Such a side reaction is (6) $2H_2O + 3S = SO_2 + 2H_2S$ 

Secondary reactions can not be avoided in a fixed bed of catalyst of any appreciable diameter and depth because of overheating of the catalyst and channeling. It is found in employing a fixed bed that an excess of oxygen is required in order to carry out the reaction and that inevitably an appreciable amount of the sulphur content of the gas appears as $SO_2$ in the gas stream containing the reaction products. The depth of bed in reactor 1, that is the depth from level L to grid 4, is preferably not more than 10 feet and may be appreciably less than 10 feet when the catalyst is finely divided or of such density that the velocity of the flow of the reactant stream is relatively low. The sulphur passing overhead from reactor 1 is condensed in heat exchanger 23 and withdrawn as a liquid through valve 36 at a temperature at which molten sulphur is not highly viscous. The preferred duration of contact of the gasiform stream with the finely divided catalyst in reactor 1 is preferably more than 1 second and less than 10 seconds.

Example 2.—Again referring to the drawing and employing as a gas to be treated the same kind of gas as in Example 1. In this case the operations are substantially the same as described in Example 1 only that oxygen is supplied in amounts substantially as indicated by Equation 2, the offtake gases in this instance comprise, besides the unreacted natural gas components, $H_2O$ and $SO_2$ which are passed through offtake 6, valve 7, conduit 33 to heat exchanger 23 and valve 35. A neutralizing agent such as ammonia is introduced into the down stream side of valve 35 by opening valve 41, whereby the $SO_2$ and $H_2O$ are caused to react with the $NH_3$ forming upon proper cooling the sulphite or acid sulphite according to the amount of $NH_3$ introduced. Sulphite formed may be removed from the gas stream as a solid by known means and oxidized to sulphate in this form very readily when desired. Equations which represent these reactions are:

(7) $H_2O + NH_3 + SO_2 = (NH_4)HSO_3$
(8) $H_2O + SO_2 + 2NH_3 = (NH_4)_2SO_3$

More heat is generated in this case than in Example 1 and it is accordingly necessary that sufficient cooling be provided in reactor 1 so that the temperature will not rise to such a point that the other constituents of the natural gas will be oxidized. Apparently it is not possible to accomplish this employing a fixed bed of catalyst without simultaneously burning some of the hydrocarbons of the natural gas. Even with a fluidized bed of solids it is essential that the temperature in the bed in reactor 1 be kept below approximately 450° C. in order to avoid hydrocarbon oxidation.

It will be noted that in the foregoing two examples the hydrogen sulphide content of the gas treated was initially 2%. When larger amounts of hydrogen sulphide are present in the gas treated appreciably more heat is generated in the reactor and therefore, more heat must be removed from the reactor per unit of time other factors remaining the same, than when lesser amounts of $H_2S$ are oxidized. It is helpful in treating gases with large amounts of oxidizable material and generating large amounts of heat in reactor 1, to circulate solids from the reactor to a treater wherein they are cooled and then return the cooled solids to the upper portion of the reactor as a heat absorbing medium as well as catalyst. The solids from reactor 1 are circulated through conduit 10 and valve 11 to the treater 12 and are removed cooled from 12 through offtake 14 and pass upwardly through valve 28 to reservoir 16 from which they pass downwardly and they pass through valve 18 under control to reactor 1. It will be noted that the cooled solids thus supplied to the reactor mix immediately with the other solids therein because a state of ebullient motion is maintained throughout the bed in reactor 1. However, in treater 2 quite the opposite condition is maintained in order that the coolant introduced through 13 into treater 12 can be effectively used by countercurrent contact with the solids therein; the treater is packed with relatively large size solids having interstices of sufficient size so that the catalyst particles can pass downwardly therethrough while the gases pass upwardly therethrough. In this manner cooling is provided in reactor 1 by supplying a large cooling surface which the fluidized particles contact. Cooling is also effected by supplying cooled catalyst to the turbulent bed in reactor 1 at a predetermined rate dependent upon the cooling effect desired.

Because it is possible to so accurately regulate temperature throughout a large mass of catalyst solids in promoting oxidation reactions it is possible to obtain oxidation effects and selective oxidation more efficiently than has been attained heretofore so far as is known.

It has been found that by a combination of steps not foreseeable from the prior art these unusual results have been obtained. These steps are (1) maintaining a high velocity of flow of gas stream initially containing the reactants, (2) thorough mixing of the oxidant and the reactants prior to introduction into contact with the hot solids, (3) employing relatively coarse grain catalysts which are not too highly active, (4) applying cooling medium to a surface in contact with the combustion zone, (5) supplying the gas-oxidant mixture to the mass at a suitable elevated temperature, and (6) recirculating cooled catalysts downwardly into the fluidized mass of hot catalyst countercurrently to the upper flow of hot gases.

The operations may be carried out in the preferential oxidation of a component of a mixture which is more readily oxidized catalytically than the other components of the mixture. Alcohols, aldehydes, and other oxidation products can be made very effectively when the higher hydrocarbons are oxidized preferentially in the presence of hydrocarbons of low molecular weight such as methane. Again, organic sulphur compounds such as carbon bisulphide may be removed from combustible gas by preferential oxidation at relatively low temperatures.

So far the oxidant has been referred to as oxygen or the oxygen in an oxygen-bearing gas but it will become obvious that other oxidizing agents may be used to promote particular selected effects. Chlorine, nitric oxide or other gasiform oxidant may be employed within the scope of this invention. Furthermore the procedures described may be conducted at substantially atmospheric pressure or at pressures greatly in excess of atmospheric pressure.

By the term ignition temperature as employed in the appended claims is meant the temperature at which incipient combustion of the substance can be promoted under conditions prevailing in contact with the fluidized solids.

Having described the invention in a manner so that it may be practiced by those skilled in the art,

What is claimed is:

1. A process for the removal of at least one impurity selected from the group consisting of hydrogen sulfide and organic sulfur compound from a hydrocarbon gas mixture containing the same which comprises maintaining a deep bed of turbulent finely-divided fluidized solids which do not chemically react with the impurity in a combustion zone, maintaining said solids at a temperature above 300° C. but below 450° C., preheating the hydrocarbon gas mixture to a temperature of about 300° C., passing the preheated gaseous mixture mixed with an amount of oxygen-containing gas substantially chemically equivalent to the amount of impurity present in the hydrocarbon gas upwardly through said bed of hot solids in the combustion zone at a velocity of 1 to 5 ft./sec. adapted to maintain said solids in said fluidized state in the combustion zone and thereby promoting the controlled oxidation of the impurity to sulfur vapor without substantially oxidizing the hydrocarbon components of the gas, withdrawing a stream of the hot fluidized solids at a point near the bottom of said combustion zone while simultaneously introducing a stream of the same cooled solids into the combustion zone at a point near the top thereof at such a rate that the temperature of the fluidized solids is held within the limits of 300° C. to 450° C. and withdrawing from the combustion zone above said bed a gaseous stream of hydrocarbons containing vaporized sulfur but substantially depleted of said impurity.

2. A method according to claim 1 in which the hydrocarbon gas is natural gas.

3. A process according to claim 1 in which the fluidized bed contains two solids one of which is catalytic to the oxidation of the impurity contained in the hydrocarbon gas and one of which is non-catalytic to said oxidation.

WILLIAM W. ODELL.

REFERENCES CITED

The following references are of record in the file of this patent:

UNITED STATES PATENTS

| Number | Name | Date |
|---|---|---|
| 1,807,528 | Hiatt | May 26, 1931 |
| 1,922,872 | Thompson | Aug. 15, 1933 |
| 2,298,641 | Schulze et al. | Oct. 13, 1942 |
| 2,340,878 | Holt et al. | Feb. 8, 1944 |
| 2,441,311 | Crowley et al. | May 11, 1948 |
| 2,447,043 | Welty et al. | Aug. 17, 1948 |

FOREIGN PATENTS

| Number | Country | Date |
|---|---|---|
| 406,495 | Great Britain | Mar. 1, 1934 |

OTHER REFERENCES

Chem. & Metallurgical Eng., June 1944; pages 97 and 98.